June 19, 1956 — F. W. E. HOESELBARTH — 2,750,969
TERRY PILE WEAVE

Original Filed May 29, 1952 — 6 Sheets-Sheet 1

INVENTOR
FRANZ W. E. HOESELBARTH
BY
ATTORNEYS

June 19, 1956  F. W. E. HOESELBARTH  2,750,969
TERRY PILE WEAVE
Original Filed May 29, 1952
6 Sheets-Sheet 2
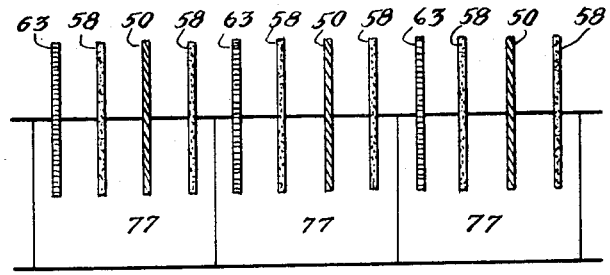
Fig. 2.
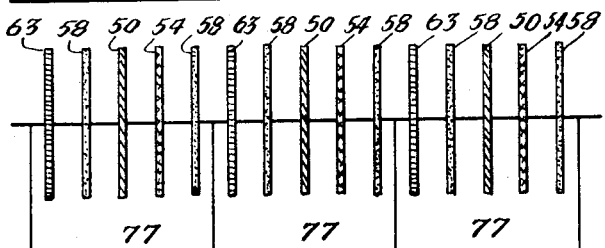
Fig. 3.
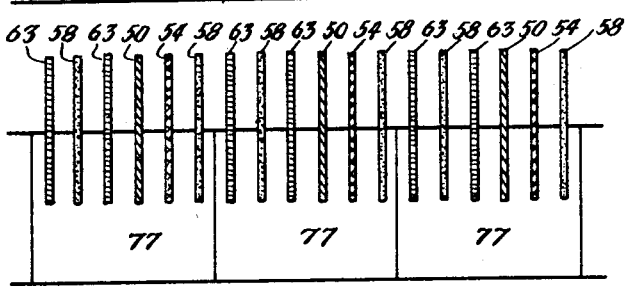
Fig. 4.
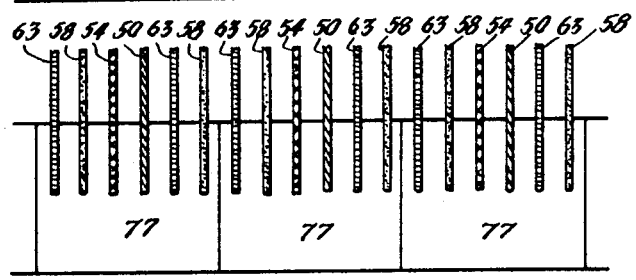
Fig. 5.
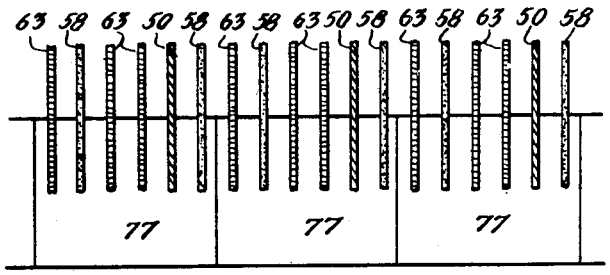
Fig. 6.
INVENTOR
FRANZ W.E. HOESELBARTH
ATTORNEYS June 19, 1956  F. W. E. HOESELBARTH  2,750,969
TERRY PILE WEAVE
Original Filed May 29, 1952  6 Sheets-Sheet 4
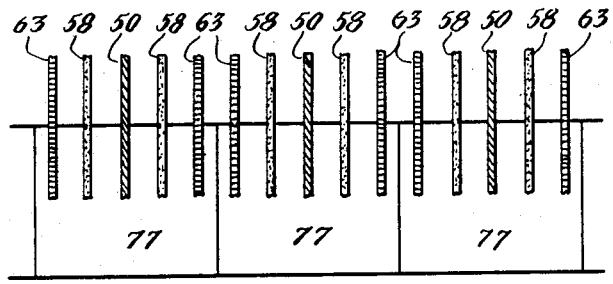
Fig. 12.
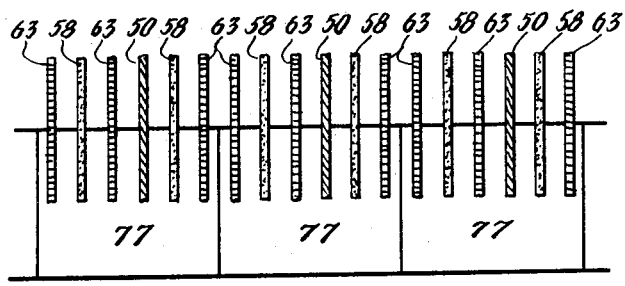
Fig. 13.
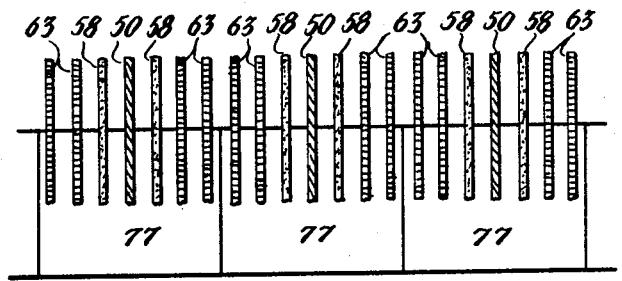
Fig. 14.
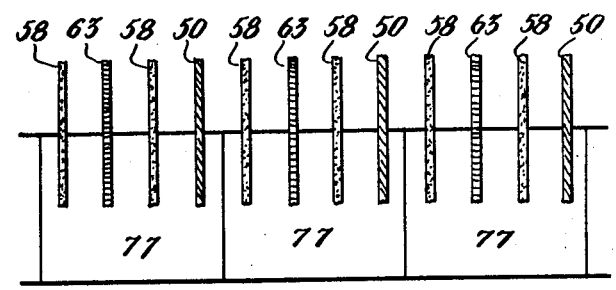
Fig. 15.
INVENTOR
FRANZ W.E. HOESELBARTH
BY
ATTORNEYS June 19, 1956 F. W. E. HOESELBARTH 2,750,969
TERRY PILE WEAVE
Original Filed May 29, 1952 6 Sheets-Sheet 5
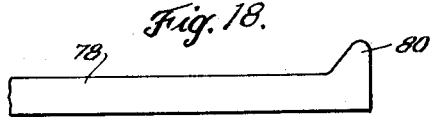
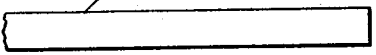
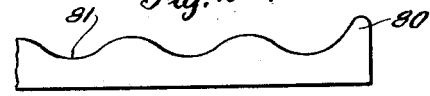
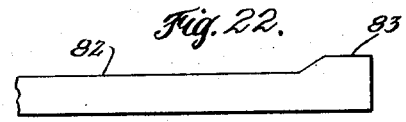
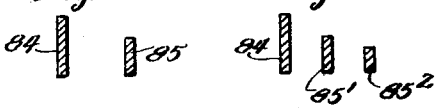
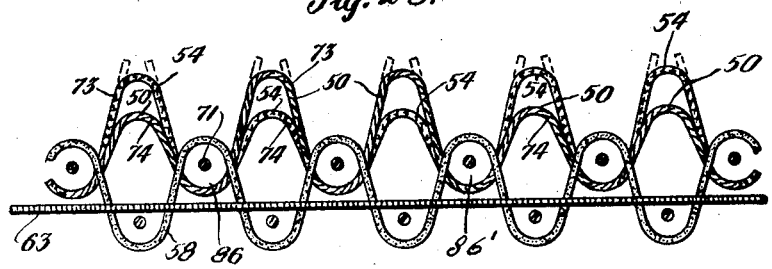
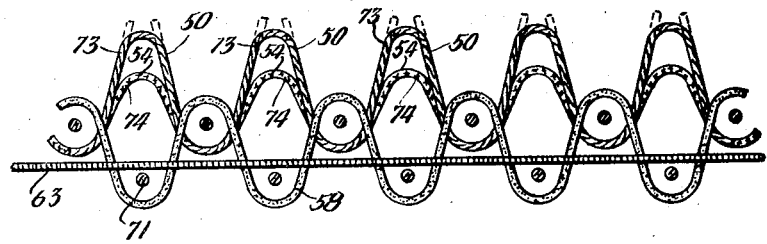
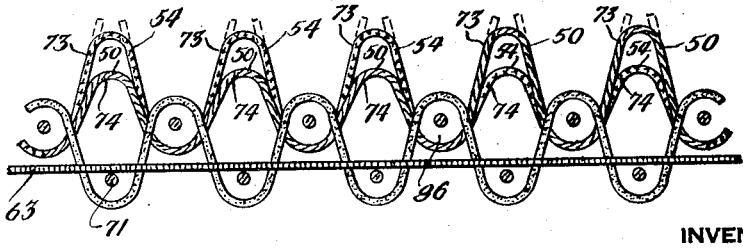
INVENTOR
FRANZ W. E. HOESELBARTH
BY
ATTORNEYS June 19, 1956     F. W. E. HOESELBARTH     2,750,969
TERRY PILE WEAVE
Original Filed May 29, 1952     6 Sheets-Sheet 6
INVENTOR
FRANZ W.E. HOESELBARTH
BY
ATTORNEYS United States Patent Office 2,750,969
Patented June 19, 1956

2,750,969
TERRY PILE WEAVE

Frank W. E. Hoeselbarth, Carlisle, Pa., assignor to C. H. Masland & Sons, Carlisle, Pa., a corporation of Pennsylvania Original application May 29, 1952, Serial No. 290,733, now Patent No. 2,714,399, dated August 2, 1955. Divided and this application July 23, 1953, Serial No. 369,815

20 Claims. (Cl. 139—406)

The present invention relates to pile fabrics and particularly to pile floor coverings such as carpets and rugs.

This application is a division of my copending application Serial No. 290,733, filed May 29, 1952, now Patent No. 2,714,399, for Terry Pile Weaving.

A purpose of the invention is to produce pile by threading-in pile warp ends between binder warp ends, slack tensioning the pile warp ends, forming a shed in which the binder warp ends are up and the pile warp ends or at least certain pile warp ends suitably also with stuffer warp ends are down, inserting a weft and beating up the weft to force pile warp ends gripped between spaced binder warp ends up into the pile.

A further purpose is at each transverse row in a pile fabric such as a carpet or a rug to raise certain pile warp ends over a wire and in weaving the same transverse row to force other pile warp ends up into the pile by gripping them between spaced binder warp ends per dent and then beating up a weft.

A further purpose is to produce cut or uncut pile projections such as tufts or loops over a wire with certain pile warp ends in a transverse row and to raise all other pile warp ends into pile loops in the same transverse row by gripping them between spaced binder warp ends per dent, slack tensioning them, and beating up a weft.

A further purpose is to make relatively higher pile projections over a wire and relatively lower pile loops by gripping slack tensioned pile warp ends between spaced binder warp ends per dent and beating up a weft.

A further purpose is to interpose pile warp ends of each of two or more pile warps between spaced binder warp ends per dent woven in opposition to the pile warp ends and desirably also to the stuffer warp ends, optionally to interpose one or more stuffer warp ends in the bracket between the binder warp ends per dent, and optionally to position one or more stuffer warp ends outside the bracket per dent, preferably employing one or more stuffer warp ends inside the bracket and one or more stuffer warp ends outside the bracket per dent.

A further purpose is to place stuffer warp ends inside the bracket between the pile warp ends and the binder warp ends.

A further purpose is to position the stuffer warp ends outside the bracket on either side of the bracket per dent.

A further purpose is to employ the principles of the invention in Wilton and Brussels carpet, and in velvet or tapestry carpet.

A further purpose is to create, in each transverse row of pile projections, pile projection of one pile warp formed over wires and pile loops of another pile warp formed by gripping slack tensioned pile warp ends between spaced binder warp ends and beating up a weft, and to reverse the warps forming respectively the pile projections formed over wires and the pile loops formed by grip of the binder warps either in each succeeding row or after several rows to obtain pattern effects.

A further purpose is to produce a staggered W-weave in which between every pair of pile projections raised over wires, a pile projection is obtained by beating up a weft against a slack tension pile warp gripped by spaced binder warps in each dent.

Further purposes appear in the specification and in the claims.

In the drawings I have chosen to illustrate one only of the numerous embodiments in which my invention appears, selecting the form shown from the standpoints of convenience in illustration, satisfactory operation and clear demonstration of the principles involved.

Figure 1 is a conventional warpwise weave step diagram showing a step of weaving a Wilton pile carpet in accordance with the invention.

Figures 2 to 17 inclusive are conventional threading-in diagrams showing the thread-ins applicable to any suitable weaves, such as Wilton, Brussels, velvet, terry or staggered W carpet weaves in accordance with the invention.

Figures 18 to 22 are fragmentary elevations showing various types of wires applicable to any of the weaves of the invention.

Figures 23 and 24 are transverse sections of adjoined wires showing variations in height.

Figure 25 is a standard warpwise weave diagram showing a complete Wilton fabric produced in accordance with the weave of Figure 1 with any of the thread-ins of Figures 2 to 16, and using any of the wires of Figures 18 to 24, it being understood that peculiarities individual to wires of different heights have been eliminated for the sake of simplicity.

Figure 26 is a standard warpwise weave diagram of a complete velvet or tapestry carpet produced in accordance with the invention.

Figure 27 is a standard warpwise weave diagram showing a completed velvet or tapestry pile carpet in accordance with the invention.

Figure 28 is a standard warpwise weave diagram of a variant form of the completed fabric.

Figure 29 is a standard warpwise weave diagram of a complete staggered W-weave produced in accordance with a variation of the invention.

Figure 30 is a fragmentary enlarged bottom plan view of a pile warp end gripped by spaced binder warp ends and about to be raised in the pile by the beat-up of a weft.

Figure 1:
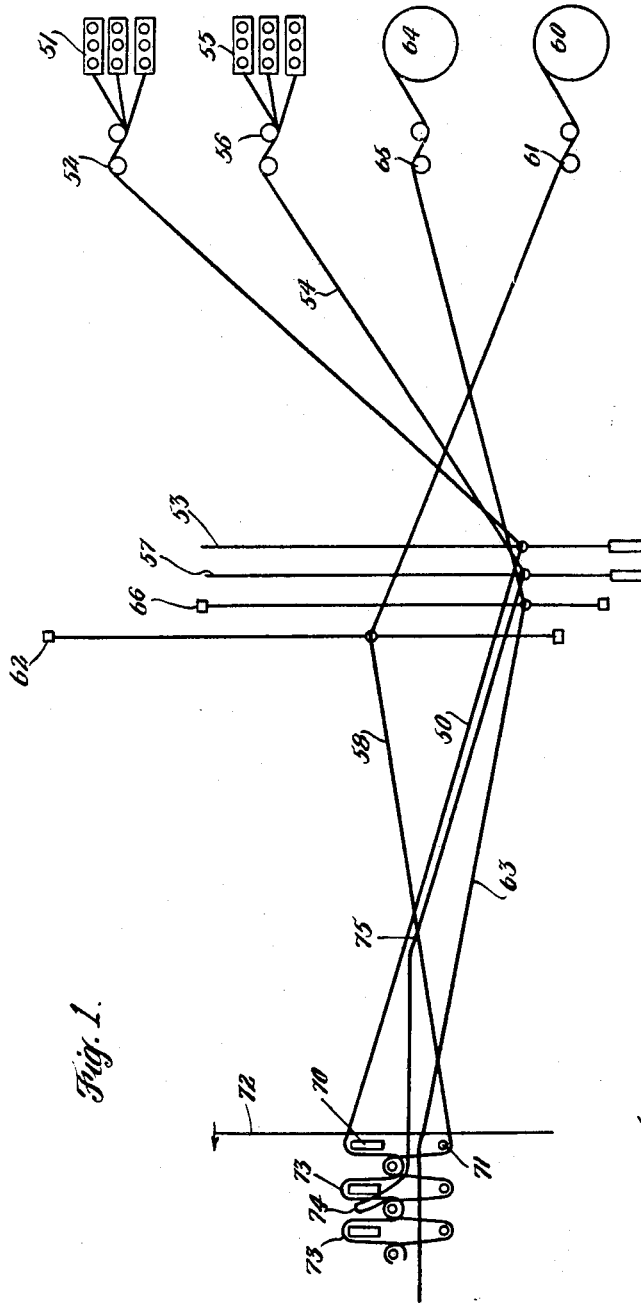

In the prior art, efforts have been made to create wire pile fabrics in which additional loops are raised by changing of the timing of the shedding motion, and closing each shed when the weft being beaten up is at a substantial distance from the fell of the fabric. This has the disadvantage of requiring substantial changes in the weaving technique, and complicating the procedure. It also results in producing a fabric which except for the pile loops has no advantage over the existing pile carpets.

In accordance with the present invention, pile loops are obtained without the necessity of using wires and preferably in addition to those secured over wires, so that pile warp ends, which in an ordinary fabric would be rejected pile warp ends, in the fabric of the invention rise in the pile, add to the coverage and the density of the pile, and laterally support the normally higher pile projections raised over the wires.

Furthermore by the modifications in the thread-in employed in the present invention, I obtain a tighter bind on the pile yarn at the back of the fabric by increasing the number of oppositions obtained in the weave.

I also obtain better control of pile and stuffer warp ends by more frequent interposition of binder warp ends at spaced points in each dent.

In the resulting fabric I increase the number of crossings weftwise of the fabric.

Another important advantage of the weave of the present invention is that lateral shrinkage of the pile fabric is reduced.

In accordance with the invention I preferably create in each transverse row of the pile, pile projections which may be cut tufts or uncut loops which are raised over wires and which constitute the selected pile warp ends in a Wilton or Brussels weave, or which constitute a selected warp in the case of velvet carpet (in velvet I include tapestry) and I also raise all the rejected pile warp ends, which in the case of Wilton or Brussels will be those not selected by the jacquard mechanism and in the case of velvet constitute the pile warp ends which are not raised over the wire, by slack tensioning the rejected pile warp ends, gripping them between spaced binder warp ends per dent, and beating up a weft. Thus all of the pile warp ends which would normally be in the back in an ordinary carpet are raised in pile loops suitably lower than the wire pile projections in each transverse row.

By the way in which I vary the warps which are raised over wires and the warps which are forced up in pile loops, pattern effects are achieved. Thus in a Wilton or Brussels weave the jacquard determines which pile warp ends are raised over a wire, and all other pile warp ends are forced up into loops at each transverse row. In a velvet weave, however, the manipulation of the pile warp heddles determines which pile warp is raised over a wire and which pile warp is forced up into loops at any position, and the fabric can be woven throughout with one pile warp as the wire pile warp and the other pile warp as the pile warp forced up into loops, or the pile warps can reverse at each wire position, or they can reverse at any predetermined number of wire positions to create the pattern effects desired. These features can be embodied in any of the carpet weaves of the character of Wilton, Brussels, velvet and tapestry.

The invention is applicable to constructions in which an individual pile warp end is bound behind two binding wefts between two positions at which it rises in the pile over wires (a W-weave), in which case the invention adds the interesting feature of forcing up a pile loop at the base of the W instead of leaving the yarn in the back at the base of the W.

While in the best aspects of the invention, the primary pile projections will be formed over wires, I will in some cases make fabrics in which the pile projections are entirely those forced up by the grip of the binder warps.

The thread-ins used are of special significance in the present invention. In all of them the pile warp end or pile warp ends representing the pile warps present are placed in a bracket per dent of the particular pattern area between spaced binder warp ends which are woven in opposition to the pile warp ends and suitably also to the stuffer warp ends, instead of being woven in opposition to one another as in usual practice.

The positioning of the stuffer warp ends is important. Where stuffer warp ends are employed, I will very desirably place one or a plurality of stuffer warp ends outside the bracket per dent and also desirably place one or a plurality of stuffer warp ends inside the bracket per dent. The stuffer warp ends which are outside the bracket per dent may permissibly be on either side of the bracket, but will preferably be on both sides of the bracket per dent.

The stuffer warp ends which are inside the bracket per dent may permissibly be on either side of the group of pile warp ends but preferably will be on both sides of the group of pile warp ends. I do not, however, recommend placing any stuffer warp end inside the group of pile warp ends as the pile warp ends should be kept together in the bracket.

A Wilton or Brussels carpet weave according to the invention is shown in Figure 25, having pile warp ends 50 and 54 selectively raised by the jacquard, a binder warp 58 and a stuffer warp 63, with wefts 71.

As explained in the parent application, the weave is suitably accomplished by applying slack tension or abnormally low tension on the pile warp ends which are to be pushed up into the pile by the grip of the binder warp ends. The exact tension to be employed on the pile warp ends will vary with the character of such ends, the height of the loops desired, the bulk and frictional coefficient of the pile warp ends, the tension on the binder warp ends and the particular thread-in which is used. For best results a tension of about one-half that which is normally used is desired on the pile warp ends, say from 0.10 pound to 0.35 pound and preferably between 0.15 pound and 0.25 pound per end. The following table shows one desirable weave sequence and Figure 1 illustrates the grip of the pile warp ends at 75 to force up a terry loop 74 adjoining loops 73 formed over wires. The pile warp ends 50 are withdrawn from a creel 51 through a tensioning device 52 and manipulated by lingoe heddles 53, the pile warp ends 54 are withdrawn from a creel 55 over tensioning device 56 and manipulated by lingoe heddles 57, the binder warp 58 is withdrawn from a beam 60 over tensioning device 61 and manipulated by heddle 66. The lay is shown at 72 and the wires at 70.

*Weave sequence*

| Step | Pile Warp End 50 | Pile Warp End 54 | Binder Warp 58 | Stuffer Warp 63 | Wire 70 | Weft 71 | Remarks |
|---|---|---|---|---|---|---|---|
| 1b | Fully raised | Half raised | Lowered | Half raised | Inserted | Inserted | Lay moves away from fell. |
| 1c | Same | Same | Same | Same | | | Lay moves toward fell, beats up wire and weft. |
| 2 | Moves down | Moves down | Moves up | Moves down | | | Weft last inserted lies under stuffer and above binder. |
| 2a | Same | Same | Same | Same | | | Binder warp grips at 75 slack tensioned pile warp ends 54. |
| 2b | Lowered | Lowered | Half raised | Lowered | | | Lay moves away from fell. |
| 2c | Same | Same | Same | Same | | Inserted | Lay moves toward fell. |
| 1 | Moves up | Moves up | Moves down | Moves up | | | Same. |
| 1a | Same | Same | Same | Same | | | Lay raises terry loop. |

The fabric of Figure 25 will be woven with one of the thread-ins of Figures 2–17 and one of the wires of the character of Figures 18–24. The pile projections 73 formed over the wires and cut or uncut as the case may be are suitably substantially higher than the pile projection 74 forced up by the grip of the binder warp ends on the slack tension rejected pile warp ends. Points of pattern change 86 and 86' are shown in Figure 25, where to the left of point 86, pile warp 54 forms the wire pile projections and pile warp 50 forms the pile projections which are forced up by the grip of the binder warps. To the right of the point of pattern change 86 due to a change in the jacquard card, pile warp 50 forms the pile projections over wires and pile warp 54 forms the pile projections forced up by the grip of the binder warp ends. At point 86' the pile warps again reverse. Of course, it will be evident that as normal in Wilton practice, the pattern change may occur in each transverse row, if desired.

Any one of a variety of different thread-ins may be employed in making up the weaves of the present invention, different embodiments being shown in Figures 2 to 17, each of which illustrates a variation which will upon occasion be employed in the weave of the invention.

As shown in each of these views, the reed has several dents 77 side by side and illustrated conventionally in the position as seen by an observer looking from the front. The thread-in illustrated in each of the Figures 2 to 17 is the same in all of the dents of a particular figure. It will be evident that the thread-in in some cases will be the same in all dents, or in other cases it will be the same in certain dents and different in other dents. For example, the thread-in of one of Figures 2 to 17 will in some cases be used in one dent and the thread-in of another of Figures 2 to 17 will be used in the next dent or the thread-in of one of Figures 2 to 17 will be used in one group of dents and the thread-in of another of Figures 2 to 17 will be used in the next group of dents and so on with recurrence of the previous thread-in or selection of another one of the thread-ins of Figures 2 to 17 in the next dent or group of dents. In this way very attractive banding effects across the fabric can be obtained, creating differences which are unusual and attractive.

In the form of Figure 2, the bracket formed by binder warp ends 58 in each dent includes only one pile warp end 50, while one stuffer warp end 63 is outside the bracket at the same side of the bracket in each dent. Thus, the binder warp ends are placed on either side of the single pile warp end and will grip it to force it up in a pile projection where the particular pile warp end is not raised in the pile.

Of course the employment of a single pile warp end per dent will not well serve the need where at least two pile warp ends are desirably present per dent. This is illustrated in Figure 3 where the bracket includes pile warp ends 50 and 54 between binder warp ends 58, with a stuffer warp end 63 outside the bracket and on the same side in each dent.

It is preferable to employ a stuffer warp end inside the bracket as well as to employ one outside the bracket. This is shown in Figure 4 where a stuffer warp end 63 inside the bracket is at the side of pile warp ends 50 and 54 which is adjoining the stuffer warp end 63 outside the bracket in each dent. Where desired, the stuffer warp end inside the bracket will be placed on the side of the pile warp ends in the bracket which is remote from the stuffer warp end outside the bracket in each dent, as shown in Figure 5.

Figure 7:
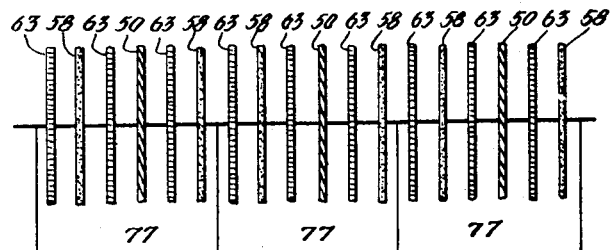

The stuffer warp ends inside the bracket will in many cases be multiple ends rather than single ends. Thus in Figure 6 I illustrate a pair of stuffer warp ends 63 side by side inside the bracket and arranged on the side of pile warp end 50 which is adjacent stuffer warp end 63 outside the bracket in each dent.

Where a plurality of stuffer warp ends are to be used inside the bracket it is preferable to place one on each side of the pile warp end or ends as illustrated in Figure 7. In this form the bracket consists of one or more pile warp ends which are surrounded on the two sides by one or more stuffer warp ends, which are in turn surrounded on the two sides by the binder warp ends. This draw-up provides two stuffer warp ends which cover the back against showing a pile end and one stuffer warp end which leans against the split and pushes one binder warp end against the pile end.

Figure 8:
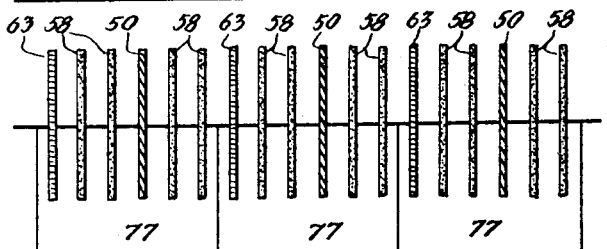

In some cases the binder warp may appear as multiple ends woven together as shown in Figure 8, where the bracket is made up of a pair of binder warp ends on either side of a pile warp end in each dent, with a stuffer warp end in each dent outside the bracket.

Figure 9:
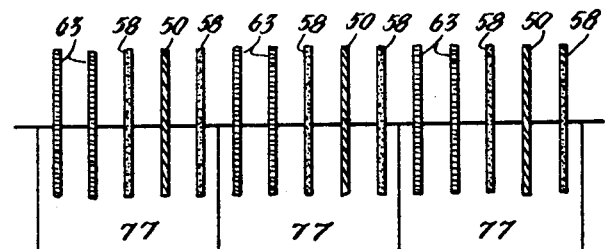

In some instances it is desirable to employ a plurality of stuffer warp ends side by side outside the bracket as illustrated in Figure 9. This has no stuffer warp end to cover the pile at the back but two stuffer warp ends push from the split against one of the binder warp ends and the other binder warp end in each dent is pushed against the next split.

Figure 10:
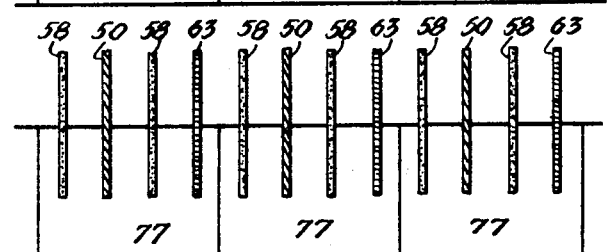

The stuffer warp end outside the bracket may be on either side of the bracket, Figure 10 showing the stuffer warp end on the opposite side of the bracket from the showings in Figures 8 and 9, for example.

Figure 11:
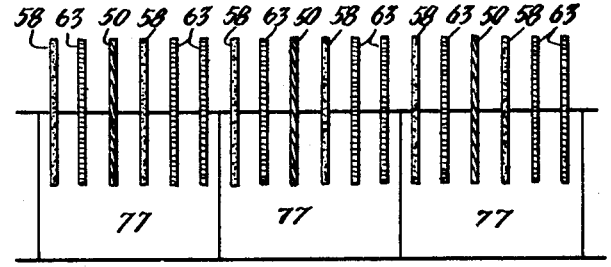

In some cases it is desirable to employ double stuffer warp ends outside the bracket along with a single stuffer warp end inside the bracket in each dent, as shown in Figure 11. In this form two stuffer warp ends outside the bracket lean against the split and push against one of the binder warp ends while the other binder warp end is leaning against the next split. There is one stuffer warp end in the bracket to cover the pile at the back.

In some cases the independent stuffer warp ends are desirably divided and placed on opposite sides of the bracket as shown in Figure 12 where each stuffer warp end adjoins one of the opposite splits and pushes against one of the binder warp ends.

The employment of spaced independent stuffer warp ends along with a stuffer warp end inside the bracket is very desirable and is regarded by me as the preferred embodiment of the various thread-ins shown. As illustrated in Figure 13, in each dent there is a stuffer warp end 63 between one of the binder warp ends and the pile warp end or ends, and there is also a stuffer warp end outside each of the binder warp ends. Each of the stuffer warp ends is squeezed by a split and pushes against one of the binder warp ends which squeezes the pile warp end or ends, suitably through a stuffer warp end in the bracket at one side.

Figure 14 shows multiple independent stuffer warp ends at each side of the bracket in each dent.

In some cases the split of the reed is placed between parts of the bracket, so that the bracket is partly in one dent and partly in the other dent. Thus in Figure 15 the pile warp end in each dent is adjoining the split, and the binder warp ends on either side are one in one dent and the other in the next dent. The independent stuffer warp end or ends outside the bracket is placed between the binder warp end in a particular dent just mentioned and a second binder warp end adjoining the opposite split in that dent, which functions as part of the next bracket.

This same arrangement is shown in Figure 16 with two independent stuffer warp ends 63 per dent placed together outside the bracket, and it is shown in Figure 17 with three independent stuffer warp ends 63 per dent placed together outside the bracket.

The wires employed in weaves of the invention may be of any of the characters as well known, being suitably cutting or noncutting, straight or wavy, high or low, in any sequence or combination. Merely to suggest various wire combinations which may be used, wires are illustrated in Figures 18 to 24. Figure 18 shows a straight wire 78 having a cutter 80 at the end remote from the head. Figure 19 shows a straight wire 78 of round or noncutting character.

Figure 20 shows a wavy wire 81 having a cutter 80 at the end remote from the head and provided with a plurality of high and low portions distributed along the length of the wire as well known in the art. Any desirable slopes between the low and the high portions in both directions may be used on the wires, the angles preferably not exceeding 15° to the longitudinal axis. Figure 21 shows a wavy wire 81 which is noncutting.

In some cases flag wires 82 will be employed, which are straight within the shed and have noncutting high portions 83 with gradual approach portions at the ends remote from the head and beyond the shed. It will be understood that any combinations of wires in pairs or sets will desirably be used, such as straight cutting wires of Figure 18 alternating with straight noncutting wires of Figure 19, or with wavy cutting or noncutting wires of Figure 20 or 21 or with flag wires of Figure 22, or wavy wires of cutting or noncutting character alternating with straight noncutting wires of Figure 19 or with flag wires of Figure 22, or any other combination or arrangement with the wires of different types. The wires used, whether straight or wavy, and cutting, noncutting or flag, may suitably be successively of different heights as illustrated in Figure 23 where high wires 84 alternate with low wires 85, or in Figure 24 where high wires 84, intermediate wires 85′ and low wires 82² successively alternate.

The slack tensioning of the pile warp ends which are to be raised in the pile by the grip of the binder warp ends will in some cases be accomplished by forward feed of the pile warp ends which are thus to be raised at a stage when corresponding take-up does not occur at the fell, and therefore when the forward feed slackens the tension. It will of course be understood that to make the forward feed effective where a tensioning device is pulling on the pile warp ends, the pile warp ends must be braked or restrained against corresponding return toward the tensioning device.

The invention is applicable to velvet or tapestry pile carpet as well as to Wilton. To illustrate this I show in Figure 26 a velvet fabric, using any one of the thread-ins of Figures 2 to 17 and any one of the wires of Figures 18 to 24 inclusive, where pile warp 50 always forms pile projections 73 over wires and pile warp 54 always forms pile projections 74 forced up by the grip of the binder warps. As in the Wilton, the wire pile projections in the velvet weave of Figure 26 are suitably high and the pile projections forced up by the binder warp grip are relatively low. The cut or uncut character and other contour features of the wire pile projections 73 depend of course upon the character of the wires, any of the types referred to being employed.

In some cases it is desirable to vary the pile warp which is raised over the wires and the pile warp which is forced up by the grip of the binder warps at intervals throughout the fabric. This will be done for example by applying a pattern change mechanism of any well known character to the mechanism for manipulating the pile warp heddles, or by modifying the pile warp heddle cams to reverse the pile warp to be raised over the wires with each first, second, third, etc., successive row. This is illustrated in Figure 27 where a pattern change is indicated at 86, all of the immediate rows of pile projections to the left of the pattern change having pile warp 54 raised over the wires and pile warp 50 forced up into pile projections by the binder warp grip, while to the right of pattern change point 86 pile warp 50 is raised over the wires and pile warp 54 is forced up into pile projections by the binder warp grip.

It will be evident that in all of the weaves thus far discussed, the pile loops forced up by the binder warp grip eventually lie to one side of the center of the space between adjoining front wefts because they are forced to one side by the presence of the wire, but as soon as the wire is withdrawn they line up symmetrically at the center of the row as illustrated in Figures 25, 26 and 27 so that truly there are high and low pile projections and suitably cut and uncut pile projections or pile projections of other different characters in the same transverse row.

The weave of the invention can be used to force up pile loops even where wires are not employed, as shown in Figure 28. For this purpose the thread-in of any of the figures will be used, and the pile warp will suitably be drawn from a beam instead of a creel. This weave can be used with a jacquard mechanism to raise certain ends.

The principles of the invention are applicable to W-weaves in which the pile warp is bound behind two front wefts between each row in which it rises in the pile and also in staggered W-weaves where alternate warps alternately rise in the pile. The invention is also applicable to such weaves in which a single binder warp or a pair of binder warps is woven in opposition to the pile warps and the stuffer warp.

The invention can be applied to a velvet or tapestry weave to form a staggered W-weave as shown in Figure 29 in which each alternate pile projection has a different one of the pile warps raised over the wire and a different one of the pile warps forced up by the grip of the binder warps into lower pile loops. Of course this weave can be produced with three or more pile warps alternating Figure 30 shows the grip of the pile warp end by the binder warps of the bracket and the way in which the beat-up of the weft 71 tends to force the pile warp ends 54 up into the pile.

In all of the weaves of the invention, the comparative slack tensioning of the pile warp ends or at least of the pile warp ends which are to form the pile projections by the grip of the binder warp ends is employed as already discussed, along with any of the thread-ins referred to. The height of the pile warps forced up into loops by the grip of the binder warp will be determined by a number of factors, including the tension on the pile warp ends, the tension on the binder warp ends, the particular thread-in or draw-up to be used, the density of the fabric in wires per inch, the thickness, coarseness and roughness of the pile yarn, and the pitch of the reed. The user will therefore determine a wide variety of desirable characteristics and vary them to suit the requirements. The main criterion however is the slackness of the pile warp ends, which should have a tension as already specified preferably about half that normally used.

It will be evident that the invention is applicable to any suitable material, such as wool, rayon, nylon or cotton in the pile, or blends thereof, and cotton or other suitable fiber in the binder warp ends and wefts, and jute, cotton, paper or the like in the stuffer warp ends.

The invention may be applied to weaves having different thread-ins in different pattern areas in accordance with the principles of my application Serial No. 191,830, filed October 24, 1950, now Patent No. 2,709,460, for Weaving Pile Fabric Having High and Low Loops. The invention may also be applied in weaving in accordance with my application Serial No. 190,280, filed October 16, 1950, now Patent No. 2,714,902, for Multiple Pile Staggered W-weaving.

One of the aspects of the invention is that where wells exist between pile projections, these are filled by a suitably relatively low loop.

In referring to the fabric, the term "course" is used to refer to the ends of one dent.

In view of my invention and disclosure variations and modifications to meet individual whim or particular need will doubtless become evident to others skilled in the art, to obtain all or part of the benefits of my invention without copying the fabric shown, and I therefore claim all such insofar as they fall within the reasonable spirit and scope of my invention.

Having thus described my invention what I claim as new and desire to secure by Letters Patent is:

1. A warp pile fabric having a binder warp, a plurality of pile warps and wefts interwoven into a fabric, having in the same transverse rows and in the same courses an end of one pile warp raised into a pile projection and an end of another pile warp raised into a pile loop, and having per course in a particular area of the fabric at least one pile warp end of each pile warp between spaced binder warp ends forming a bracket, the binder warp ends all being woven together and in opposition to all of the pile warp ends.

2. A warp pile fabric according to claim 1, having a stuffer warp woven in opposition to the binder warp ends, there being per course of the particular area of the fabric at least one stuffer warp end outside the bracket.

3. A warp pile fabric according to claim 1, having a stuffer warp woven in opposition to the binder warp ends and having per course of the particular area of the fabric at least one stuffer warp end between the spaced binder warp ends forming the bracket.

4. A warp pile fabric according to claim 1, having a stuffer warp woven in opposition to the binder warp ends and having per course of the particular area of the fabric at least one stuffer warp end between the spaced binder warp ends forming the bracket and at least one stuffer warp end per course outside the bracket.

5. A warp pile fabric according to claim 1, having a stuffer warp woven in opposition to the binder warp ends and having per course of the particular area of the fabric a plurality of stuffer warp ends between the spaced binder warp ends forming the bracket and at least one stuffer warp end per course outside the bracket.

6. A warp pile fabric according to claim 1, having a stuffer warp woven in opposition to the binder warp ends and having per course of the particular area of the fabric at least one pile warp end between spaced stuffer warp ends which in turn are between spaced binder warp ends forming a bracket, and at least one stuffer warp end per course outside the bracket.

7. A warp pile fabric according to claim 1, having a stuffer warp woven in opposition to the binder warp ends and having per course of the particular area of the fabric at least one stuffer warp end between the spaced binder warp ends forming the bracket and a plurality of stuffer warp ends per course outside the bracket.

8. A warp pile fabric according to claim 1, having a stuffer warp woven in opposition to the binder warp ends and having per course of the particular area of the fabric at least one stuffer warp end between the spaced binder warp ends forming the bracket and at least one stuffer warp end per course on each side of the bracket.

9. A warp pile fabric having a binder warp, a plurality of pile warps, a stuffer warp and wefts interwoven into a fabric, having in the same transverse rows and in the same courses an end of one pile warp raised into a relatively high pile projection and an end of another pile warp raised into a relatively low pile loop, and having per course in a particular area of the fabric at least one pile warp end of each pile warp between spaced binder warp ends forming a bracket, the binder warp ends all being woven together and in opposition to all of the pile warp ends, and to the stuffer warp.

10. A warp pile fabric according to claim 9, having per course of the particular area of the fabric at least one stuffer warp end outside the bracket.

11. A warp pile fabric according to claim 9, having per course of the particular area of the fabric at least one stuffer warp end between the spaced binder warp ends forming the bracket and at least one stuffer warp end per course outside the bracket.

12. A warp pile fabric according to claim 9, having per course of the particular area of the fabric a plurality of stuffer warp ends between the spaced binder warp ends forming the bracket.

13. A warp pile fabric according to claim 9, having per course of the particular area of the fabric spaced stuffer warp ends on either side of the pile warp end or ends which in turn are between the spaced binder warp ends forming the bracket.

14. A warp pile fabric according to claim 9, having per course in a particular area of the fabric a plurality of stuffer warp ends outside the bracket.

15. A warp pile fabric according to claim 9, having per course in a particular area of the fabric at least one stuffer warp end between the spaced binder warp ends forming the bracket, and at least one stuffer warp end on each side of the bracket.

16. A velvet warp pile carpet having a binder warp, a plurality of pile warps, a stuffer warp and wefts interwoven into a fabric, having all of the pile warps raised in pile projections in each transverse row, some of the pile warp ends in each row forming relatively high pile projections and the others of the pile warp ends in each row forming relatively low pile loops, there being in each transverse row and in the same courses ends of at least two pile warps raised in pile projections, and having per course at least one pile warp end of each pile warp between spaced binder warp ends forming a bracket, the binder warp ends all being woven together and in opposition to all of the pile warp ends and to the stuffer warp ends.

17. A velvet warp pile carpet having a binder warp, a plurality of pile warps, a stuffer warp and wefts interwoven into a fabric, all of the ends of each of the pile warps being raised into pile projections in each transverse row in the fabric, some of which pile projections are relatively high and the others of which are relatively low loops, and having per course at least one pile warp end of each pile warp and at least one stuffer warp end between spaced binder warp ends forming a bracket and at least one stuffer warp end per course outside of the bracket, the binder warp ends all being woven together and in opposition to all of the pile warp ends and to stuffer warp ends.

18. A velvet warp pile carpet having a binder warp, a plurality of pile warps, a stuffer warp and wefts interwoven into a fabric, having in each transverse row of the fabric all of the ends of all pile warps raised in pile projections, having in first transverse rows one pile warp raised in relatively high pile projections and another pile warp raised in relatively low pile loops, having in second transverse rows alternating with the first rows the one pile warp raised in relatively low loops and the other pile warp raised in relatively high pile projections, and having per course at least one pile warp end of each pile warp between spaced binder warp ends forming a bracket, the binder warp ends all being woven together and in opposition to all of the pile warp ends and to the stuffer warp ends.

19. A velvet warp pile carpet having a binder warp, a plurality of pile warps, a stuffer warp and wefts interwoven into a fabric, having in each transverse row all ends of all pile warps raised into pile projections, having in one pattern area one pile warp raised in relatively high pile projections and in another pattern area the one pile warp raised in relatively low pile loops, having in the one pattern area another pile warp raised in relatively low pile loops and in the other pattern area the other pile warp raised in relatively high pile projections, and having per course at least one pile warp end of each pile warp between spaced binder warp ends forming a bracket, the binder warp ends all being woven together and in opposition of all the pile warp ends.

20. A velvet warp pile carpet having a single binder warp, a pair of pile warps, a stuffer warp and wefts interwoven into a fabric, all of the ends of both pile warps being raised in the pile in each transverse row of the fabric, each pile warp being raised in relatively high pile projections in alternate transverse rows and in relatively low pile loops in intermediate transverse rows, there being in each transverse row relatively high pile projections of one pile warp and relatively low pile loops of the other pile warp, and having per course in the fabric at least one pile warp end of each pile warp between spaced binder warp ends forming a bracket, the binder warp ends all being woven together and in opposition to all of the pile warp ends.

References Cited in the file of this patent

UNITED STATES PATENTS

| | | |
|---|---|---|
| 2,141,152 | Kaufman | Dec. 20, 1938 |
| 2,553,303 | Crawford | May 15, 1951 |
| 2,573,841 | Groat | Nov. 6, 1951 |